(12) United States Patent
Ellenbogen

(10) Patent No.: US 6,218,943 B1
(45) Date of Patent: Apr. 17, 2001

(54) CONTRABAND DETECTION AND ARTICLE RECLAIM SYSTEM

(75) Inventor: Michael P. Ellenbogen, Charlestown, MA (US)

(73) Assignee: Vivid Technologies, Inc., Woburn, MA (US)

( * ) Notice: Subject to any disclaimer, the term of this patent is extended or adjusted under 35 U.S.C. 154(b) by 0 days.

(21) Appl. No.: 09/276,439

(22) Filed: Mar. 25, 1999

Related U.S. Application Data

(60) Provisional application No. 60/079,691, filed on Mar. 27, 1998.

(51) Int. Cl.[7] .................................................. G08B 13/14
(52) U.S. Cl. .................................. 340/572.4; 340/572.1; 378/9; 378/57
(58) Field of Search .............................. 340/572.1, 572.4, 340/572.8; 378/9, 57; 342/179; 250/288

(56) References Cited

U.S. PATENT DOCUMENTS

| | | | |
|---|---|---|---|
| 4,021,726 | 5/1977 | Garroway et al. | 324/0.5 A |
| 4,539,648 * | 9/1985 | Schatzki | 364/555 |
| 5,073,782 * | 12/1991 | Huguenin et al. | 342/179 |
| 5,098,640 * | 3/1992 | Gozani et al. | 376/166 |
| 5,126,674 | 6/1992 | Miller et al. | 324/309 |
| 5,162,652 * | 11/1992 | Cohen et al. | 250/288 |
| 5,182,764 | 1/1993 | Peschmann et al. | 378/57 |
| 5,227,724 | 7/1993 | Cory et al. | 324/307 |
| 5,227,725 | 7/1993 | Cory et al. | 324/309 |
| 5,227,800 * | 7/1993 | Huguenin et al. | 342/179 |
| 5,233,300 | 8/1993 | Buess et al. | 324/307 |
| 5,319,547 | 6/1994 | Krug et al. | 364/409 |
| 5,490,218 | 2/1996 | Krug et al. | 382/100 |
| 5,592,083 * | 1/1997 | Magnuson et al. | 324/300 |
| 5,600,700 * | 2/1997 | Krug et al. | 378/57 |
| 5,642,393 * | 6/1997 | Krug et al. | 378/57 |
| 5,692,029 * | 11/1997 | Husseiny et al. | 378/88 |
| 5,699,400 | 12/1997 | Lee et al. | 378/57 |
| 5,784,430 * | 7/1998 | Sredniawski | 378/57 |
| 5,974,111 * | 10/1999 | Krug et al. | 378/57 |
| 6,018,562 * | 1/2000 | Willson | 378/9 |

\* cited by examiner

*Primary Examiner*—Jeffery Hofsass
*Assistant Examiner*—Toan Pham
(74) *Attorney, Agent, or Firm*—Cooper & Dunham LLP

(57) ABSTRACT

A contraband detection and article reclaim system includes at least one article inspection system configured to derive inspection data from an article and compare the inspection data to target object data to detect contraband, and to assign matching information to each article in which contraband was detected that matches the article to its inspection data. The at least one article inspection system is connected to a server and the inspection data and the matching information are transferred to the server. An article tagging system is configured to generate a tag for each article in which contraband was detected. The tag includes the matching information about the article and at least one workstation coupled to said server and configured to permit entry of the matching information so that the inspection data of an article in which contraband was detected can be transferred to the workstation and to display the inspection data.

4 Claims, 9 Drawing Sheets

CONTRABAND DETECTION AND ARTICLE RECLAIM SYSTEM

REFERENCE TO RELATED APPLICATION

This present application claims the benefit of provisional Application Ser. No. 60/079,691, filed on Mar. 27, 1998, which is hereby incorporated herein by reference in its entirety including Appendix A.

BACKGROUND

1. Field

This present application generally relates to contraband detection and article reclaim systems and techniques that inspect articles for contraband and route articles suspected of containing contraband for further inspection. More particularly, the application relates to baggage inspections systems that use automated systems to inspect articles such as inbound passenger bags for contraband, identify suspect bags and route the suspect bags for further inspection.

2. Description of the Related Art

For health, safety and welfare considerations the entry into particular geographical regions and in more localized areas, such as places of work, education and entertainment, of certain materials, goods and other items (collectively contraband) is prohibited. As a result, entities that have an interest in prohibiting the entry of contraband into a region or area (interested agencies) have to inspect various articles to ensure that no contraband is being brought into the region or area.

A common situation involves international airline travel. With airline travel, passenger luggage, baggage or other articles (collectively articles) are often inspected on two occasions: 1) prior to loading the articles on a plane; and 2) after the articles are unloaded from a plane for passenger reclaim or for transfer to another plane. When loading articles on a plane every article is inspected typically using x-ray based inspection machines or other screening techniques including computer tomography (CT) scanning, and nuclear quadrupole resonance (NQR) scanning, etc. However, after unloading, inspection of inbound articles is often conducted after passenger reclaim, and the inspection typically consist of personal profiling of passengers by inspectors followed by manual searching and/or x-ray inspection of suspect articles. This inbound inspection technique is often slow, invasive and typically limits the number of inbound and/or transfer articles that can be inspected. As a result, with current inbound inspection programs every inbound article cannot be inspected without substantial passenger inconvenience.

SUMMARY

Figure 1:
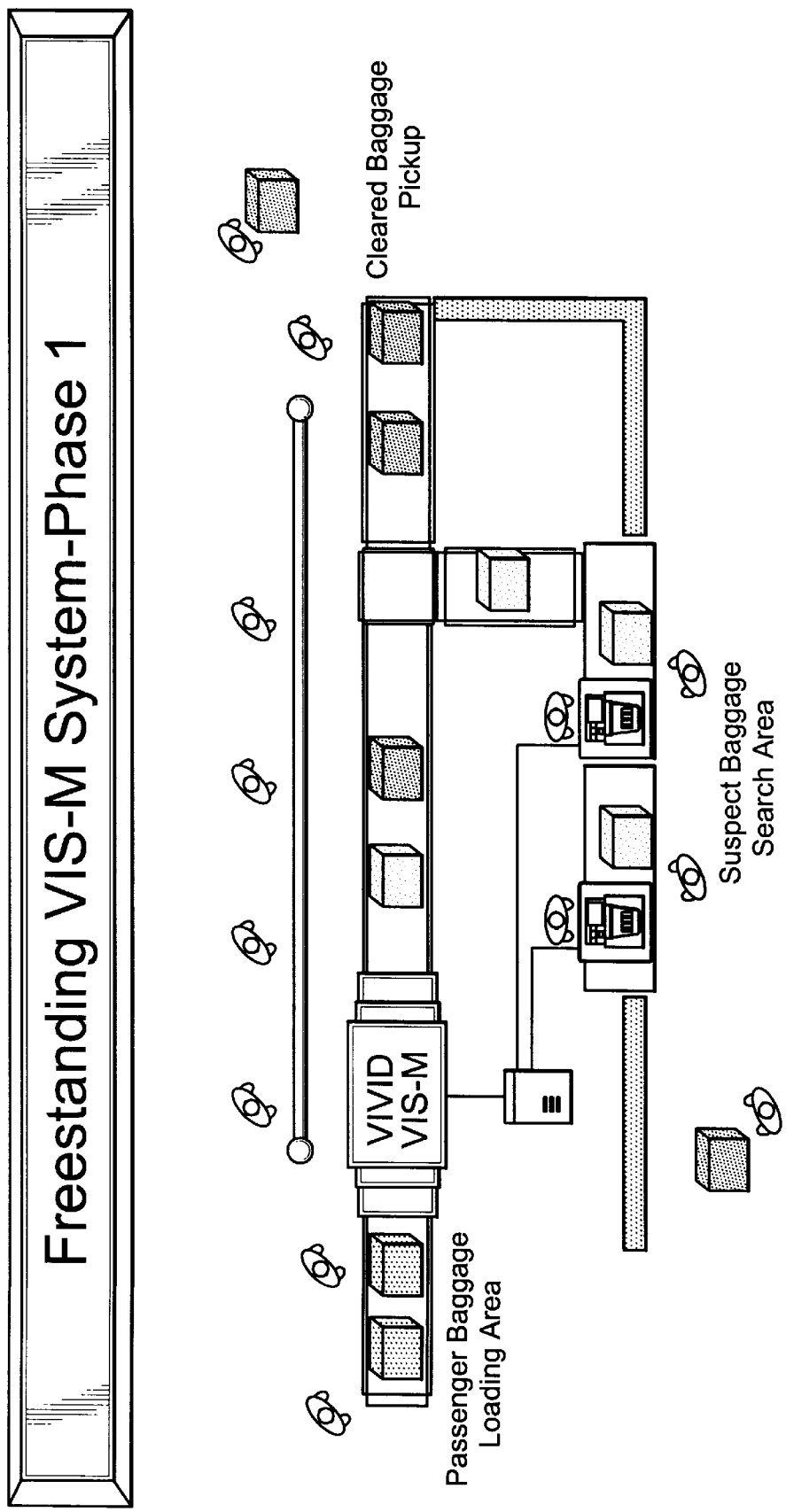
FIG. 1 illustrates an embodiment of the contraband detection and article reclaim system having an article inspection system incorporated into a conventional baggage reclaim conveyor system and a suspect baggage inspection (or search) area that includes one or more inspector workstations.
Figure 2:
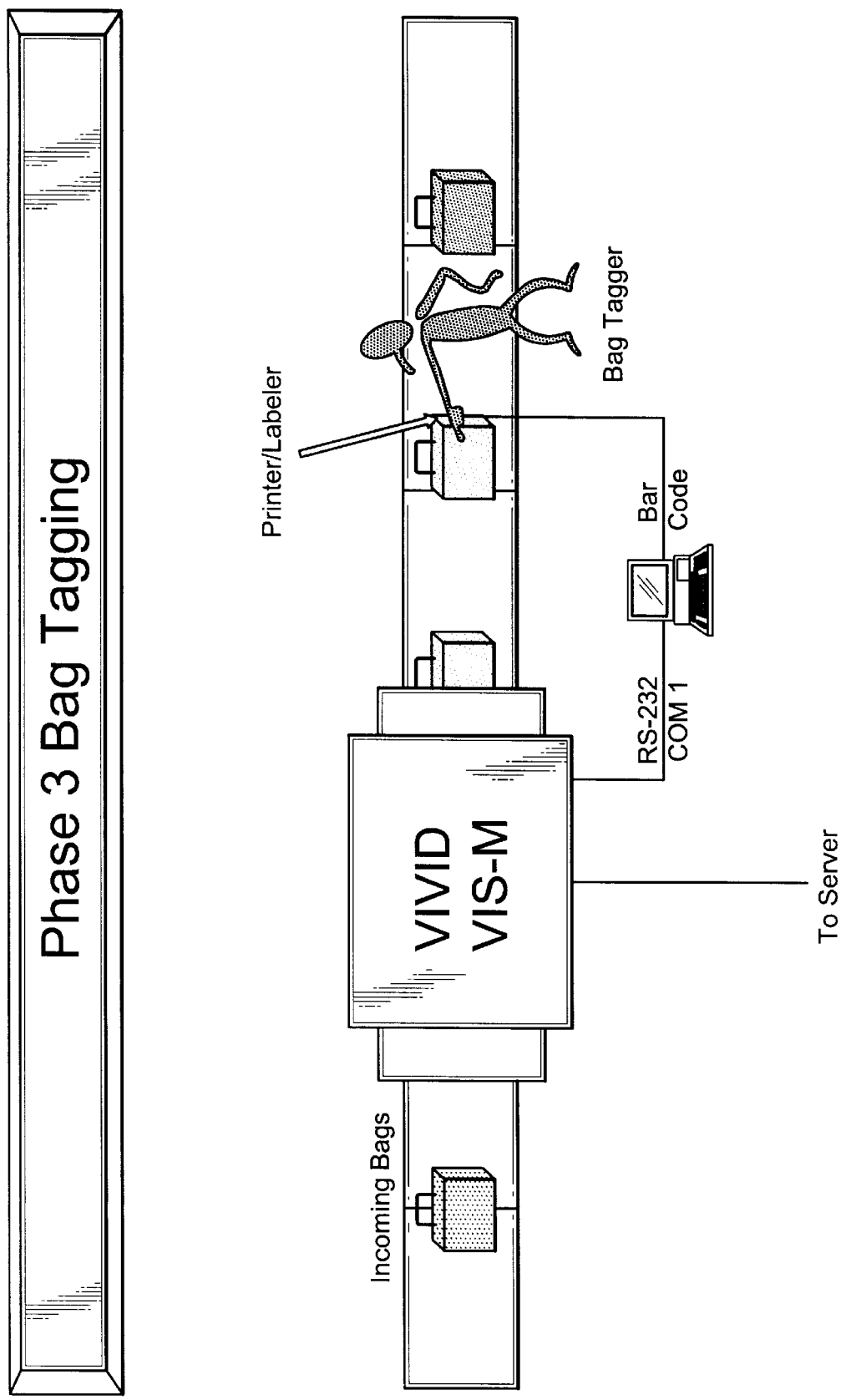
FIG. 2 illustrates a tagging system that receives data from the article inspection system and generates a tag that can be placed on suspect articles manually.

Generally, the contraband detection and article reclaim system according to the present application inspects every or most of the inbound articles for contraband by taking measurement data pertaining to the contents of the article and comparing data for each object in the article to data characterizing known target materials, and then maintains and correlates data (or scan or signature data) with the article in a way that can be retrieved after the article is reclaimed by a passenger. Articles suspected to contain contraband are identified as suspect articles so that inspectors can view the data or images of the contents of suspect articles, manually search suspect articles and conduct personal interviews with persons reclaiming the suspect articles. Articles deemed not to contain contraband can be transferred to conventional reclaim areas without interrupting the reclaim process.

The contraband detection and article reclaim system and process according to the present application can be integrated into currently existing airport inbound baggage reclaim conveyor systems. The system allows inspectors to identify suspect articles using article inspection and article tagging prior to passengers leaving the reclaim area with suspect articles. The inspectors are typically associated with interested agencies, such as governmental agencies (e.g., Customs, Agriculture, Fish and Wildlife and other law enforcement agencies) as well as industrial agencies (e.g., corporate security agencies).

The contraband detection and article reclaim system includes an article inspection portion, a suspect article tagging portion and a suspect article inspection portion. The article inspection portion of the system of the present application uses a series of object determining algorithms and a data processing systems to collect, analyze, compare and store data for the contents of each article inspected. During inspection an article (e.g., luggage or other baggage) can be imaged using for example an x-ray based article inspection system. During inspection, objects in each article are compared to stored models of target materials at a high rate of speed. Typically, an article may contain many objects of various shapes, size, thickness, density and composition. With the object determining algorithms, data for each object within an article can be collected even if there are other overlying or underlying objects relative to, for example, the x-ray source and detector. That is, if an object is surrounded by clutter, the system of the present application electronically isolates each object so that measurements of only one object are compared to the target material models stored in memory. This process is repeated until substantially all of the objects have been examined, or at least until one target material has been found. With the system of the present application, articles suspected to have target materials are identified and tagged.

The system according to the present application may be used for inspecting articles in many varying situations. For convenience, the system will be described herein for use in inspecting. Various embodiments of the contraband detection and article reclaim system are shown in FIGS. 1–4.

FIG. 1 shows an embodiment of the contraband detection and article reclaim system having an article inspection system incorporated into a conventional baggage reclaim conveyor system and a suspect baggage inspection (or search) area that includes one or more inspector workstations. In this embodiment, inbound baggage (or other articles) are passed through the articles inspection system and bags that pass inspection (identified in FIG. 1 in green) are conveyed to a cleared baggage pick-up area for reclaim, while bags that fail inspection (identified in FIG. 1 in red) are conveyed to the suspect baggage inspection (or search) area for further inspection.

As will be described in more detail below, the inspector workstations in the inspection area permit inspectors to retrieve images and/or other data of the contents of each suspect bag for review while, for example, manually inspecting a suspect bag.

The contraband detector and article reclaim system's article (or baggage) tagging portion permits inspectors to identify suspect bags. The tagging system includes a tag generator and/or printer, such as a PC workstation, coupled to the article inspection system using for example an RS-232 serial communication link.

Figure 3:
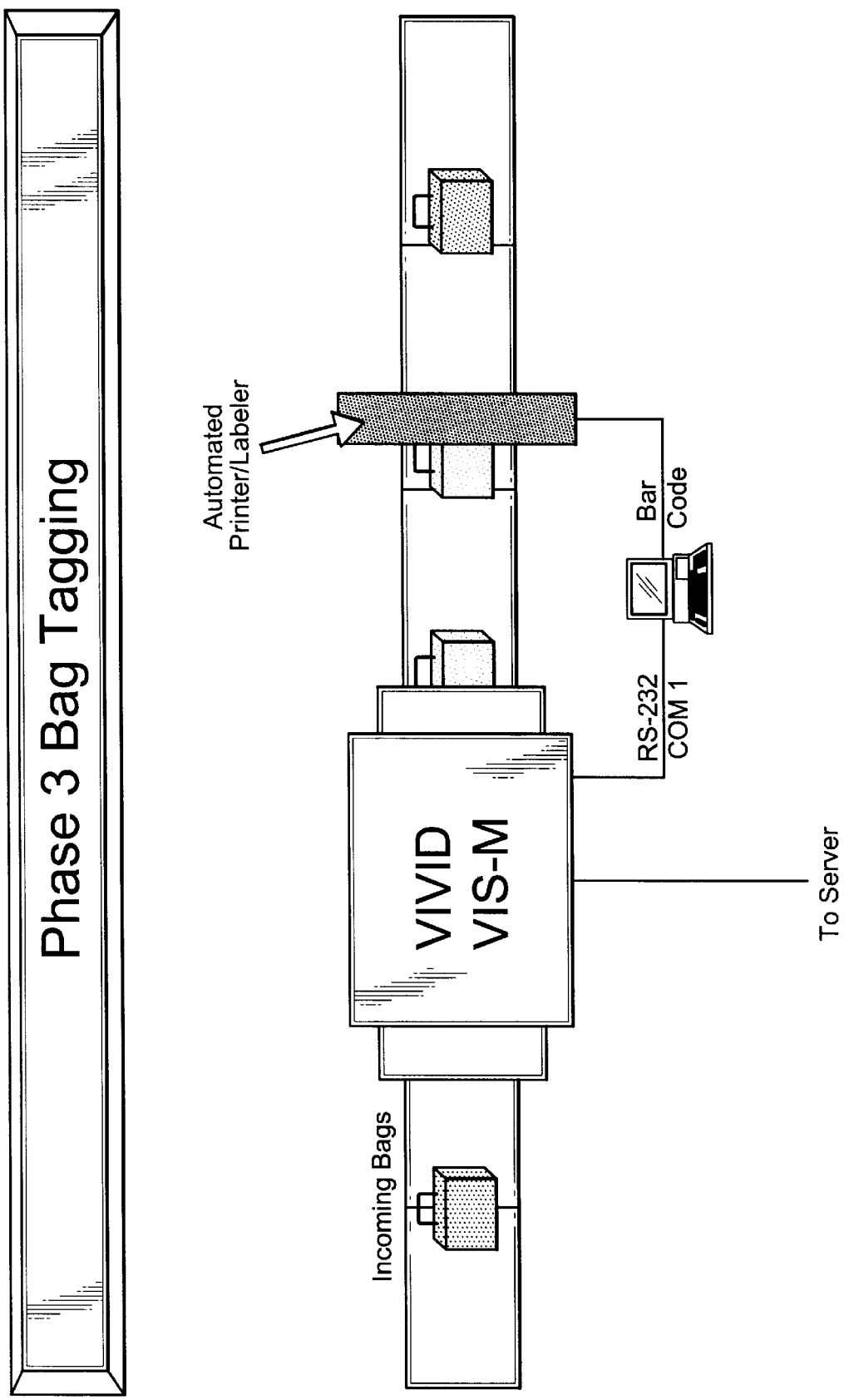
FIG. 3 illustrates a tagging system that receives data from the article inspection system and generates a tag that can be placed on suspect articles automatically.

The tagging system receives data from the article inspection system for printing a bar coded label, alpha-numeric tag or radio frequency (RF) tag that can be placed on the suspect article either manually (seen in FIG. 2) or automatically (seen in FIG. 3).

Figure 4:
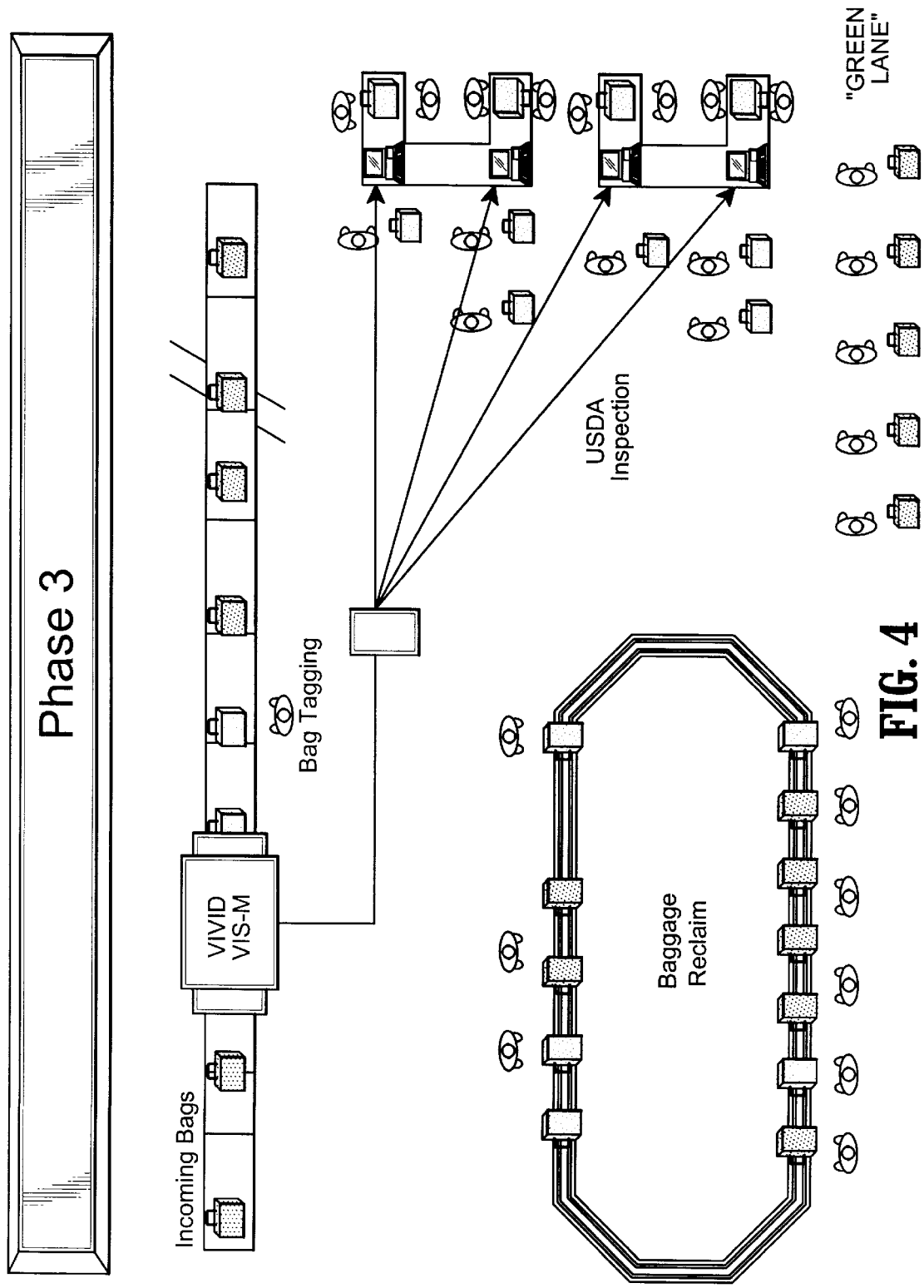
FIG. 4 illustrates an alternative embodiment of the contraband detection and article reclaim system.

FIG. 4 illustrates an alternative embodiment of the contraband detection and article reclaim system. In this embodiment, inbound bags are inspected by the article inspection system and suspect bags are tagged. The tagged suspect bags and the cleared bags are then conveyed along the baggage reclaim conveyor system to a baggage reclaim area. Passengers reclaiming tagged bags are then directed to an inspection area for further bag inspection and passengers carrying cleared bags are permitted to leave without further inconvenience.

The contraband detection and article reclaim system according to the present application performs five main functions:

1. Inspection of the contents of each article for target objects or materials (i.e., contraband) using an automated article inspection system that takes an image (or images) of the contents of each article, or otherwise analyzes the contents of each article using, for example an RF signature data obtained from NQR scanning, and compares the image data (or signature data) to previously stored data defining target materials or objects;
2. Assignment of an article identification number to each suspect article image which permits the matching of suspect articles to their corresponding image and/or other data so that inspectors can later view the image and/or other data of the contents of a particular article;
3. Storage and transfer of images and/or other data associated with suspect articles to one or more workstations or to a central server for storage and/or display;
4. Tagging of suspect articles with an alert notice that, for example, instructs a person reclaiming a suspect article to proceed to an inspection area, and that includes the assigned article identification number so that inspectors can input the article inspection number to retrieve image and/or other data corresponding to a suspect article; and
5. Retrieval of an image or images and/or other data associated with a suspect article at an inspector workstation so that inspectors can determine the type and/or location of the suspected contraband.

Article Inspection

The article inspection system preferably uses a dual energy x-ray system combined with a high speed analysis computer to efficiently and automatically inspect articles for the presence of targeted materials. The system is able to automatically detect a wide range of materials including agricultural products, drugs, explosives and/or currency, depending on the software detection program used. Preferably, the detection technique uses dual energy x-rays to measure the effective atomic number ($Z_{eff}$), mass and density of objects within an article to discriminate targeted materials from innocuous objects.

Figure 5:
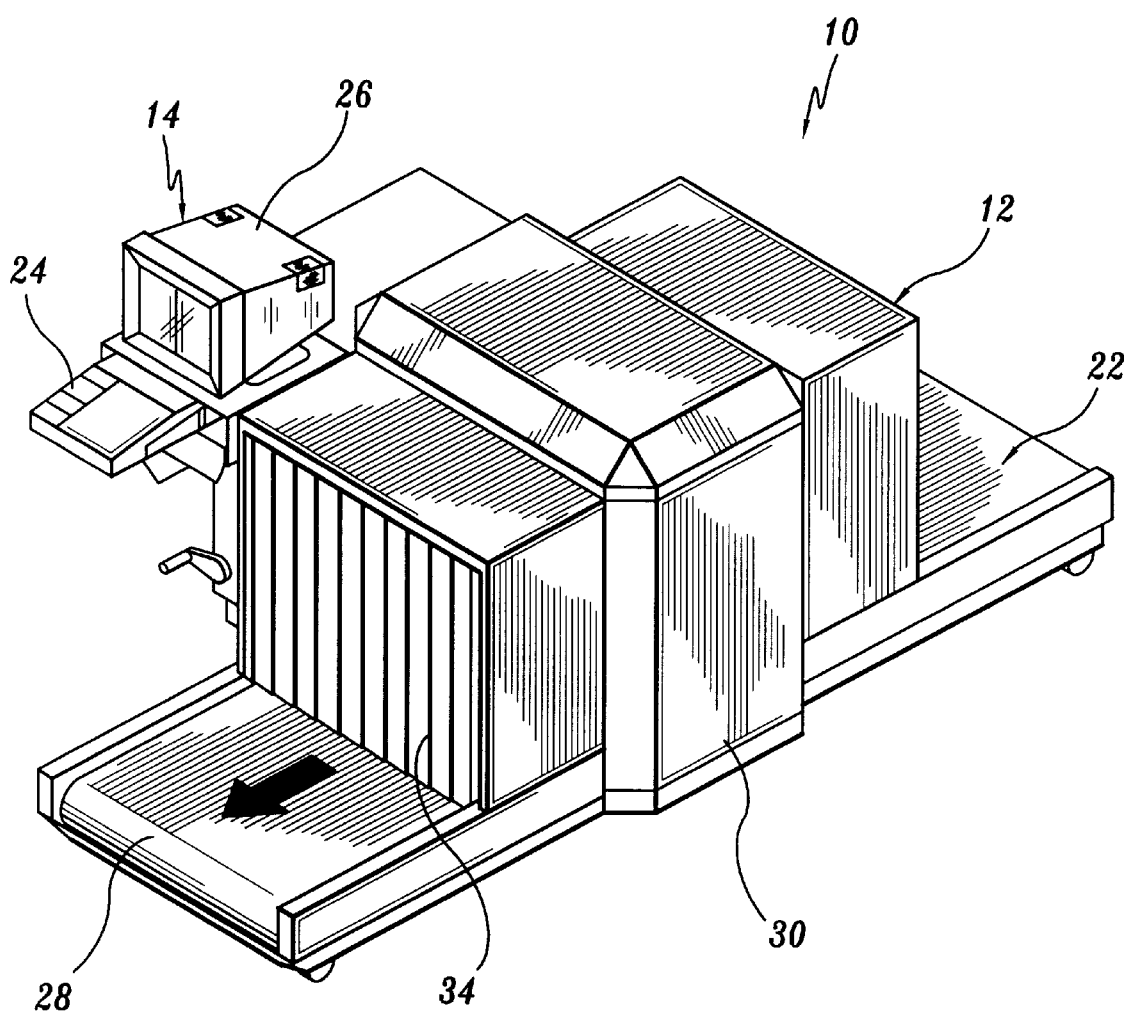
FIG. 5 is a perspective view of an exemplary embodiment of an article inspection system.
Figure 6:
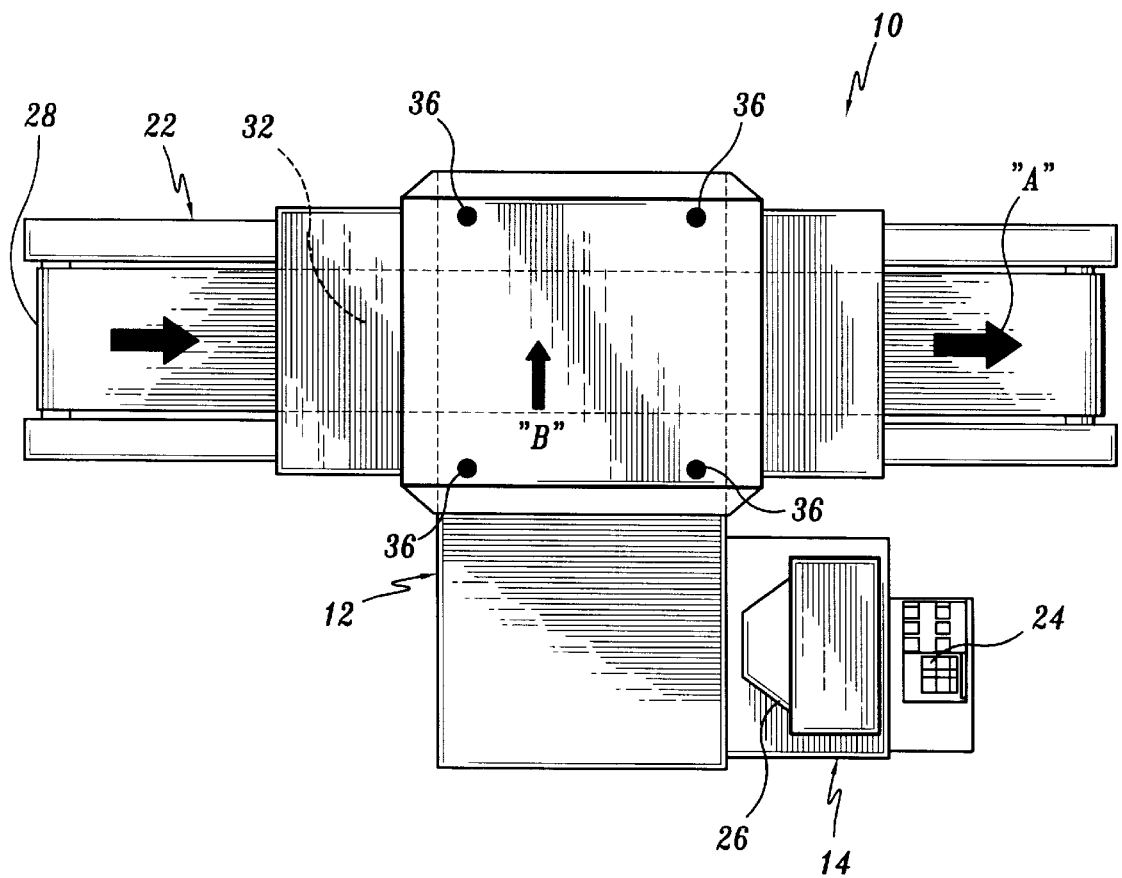
FIG. 6 is a top plan view of the article inspection system of FIG. 5.
Figure 7:
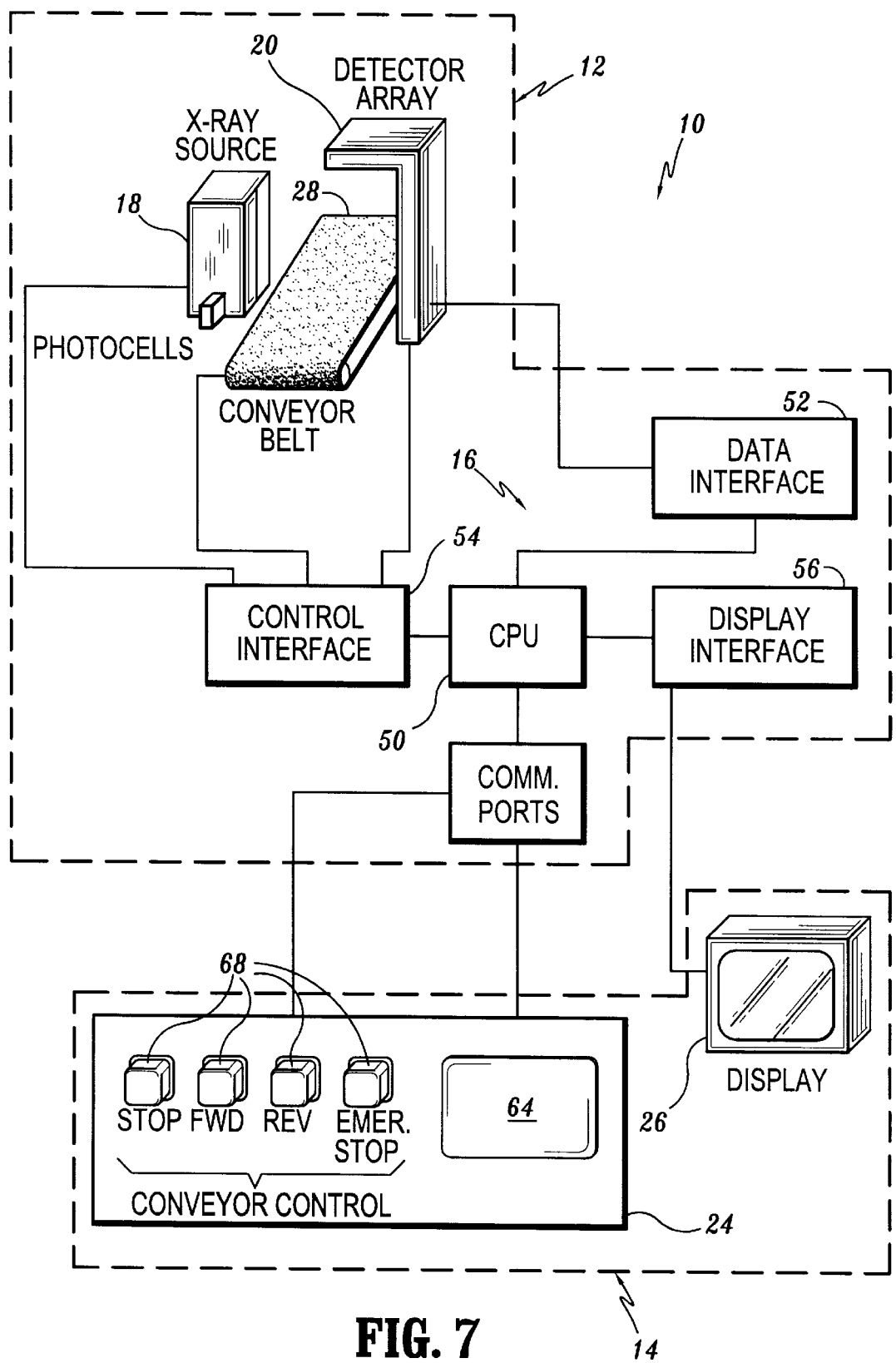
FIG. 7 is a block diagram of one configuration of the article inspection system according to the present application.

One exemplary article inspection system is shown in FIGS. 5–7. This article inspection system 10 includes scanner system 12, an operator console 14 and a controller 16 which controls the operation of the scanner system and the operator console. The scanner system 12 utilizes an x-ray source 18, a radiation detector 20, and a conveyor system 22 to transport an article to a position between the x-ray source and radiation detector and scan the article. The operator console 14 includes an operator input device 24 and a display device 26. The conveyor system 22 has a conveyor belt 28 and associated belt drive mechanisms (e.g., a power roller not shown) that move the article through the x-ray beam.

Typically, the x-ray source 18 and the radiation detector 20 are enclosed in a common housing 30, seen in FIG. 1, and the conveyor belt 28 of the conveyor system 22 passes through a tunnel 32 in the housing 30 to move the article being inspected through a fan-shaped beam or beams, or into position for scanning by a movable pencil shaped beam. Entrance and exit ends of the tunnel are blocked by lead curtains 34 to limit x-ray scatter. The tunnel 32 also includes a pair of article detector assemblies, e.g., photocells 36 which detect when an article enters the tunnel and when the article exits the tunnel. Indications from these article detector assemblies are transferred to the controller 16 and subsequently displayed on the display device 26 of the operator console so that the operator has an indication when the article enters and exits the tunnel. Thereafter, the operator can change the operation (or movement) of the conveyor belt 28 using control switches on the operator console.

The controller 16 may be a single processor based unit or a unit having an array of processors. For the present discussion the term controller contemplates both configurations. As seen in the exemplary configuration in FIG. 3, the controller 16 includes a central processing unit (CPU) 50 having memory (e.g., RAM and ROM), stored programs (e.g., system and application programs), image processing circuitry to convert digitized radiation detector signals (scan data) into image data, and input/output circuitry to interface with other components of the article inspection system. The controller may be configured so that the CPU 50 is coupled to a data interface 52 connected to the radiation detector 20. The data interface 52 is a communication interface that formats digitized signals (scan data) from the radiation detector 20 for processing by the CPU 50. The data interface 52 provides the communication hardware to permit the controller 16 to interact with the various types of circuitry used in commercially available radiation detectors, such as the model VIS manufactured by Vivid Technologies, Inc. Thus, the controller 16 is independent of the various radiation detectors that can be used in the scanner system 12. A control interface 54 is coupled to the CPU 50 and is configured to send control signals to the scanner system conveyor and to receive, for example, system status signals from the various commercially available scanner systems components. A display interface 56 is coupled to the CPU 50 and is provided to format the image data processed by the CPU for display in various modes, and to provide general managing of the display device 26.

The controller may be an individual unit such as a personal computer having, for example, a Pentium® processor. Further, the processing system may include an array of high speed processors (e.g., a plurality of Pentium® based processors) which processes the digitized output signals from the radiation detector 20 and generates image data for either displaying the contents of the article being inspected or for transfer to a workstation or central server for storage and subsequent display.

The x-ray source 18 generates and emits a fan-shaped beam or beams or movable pencil beam of, for example, single energy or dual energy x-rays that penetrates articles being inspected. The article is x-rayed when moved through the beam or beams by the conveyor system. Such x-ray sources are known and include an x-ray tube, associated high voltage power supply, and may include an internal sample reference system for calibration. The x-ray source is controlled by the controller 16. In instances where the x-ray source emits a fan-shaped beam, the beam is preferably in a plane perpendicular to the direction of movement of the article passing through the beam. Thus, in the configuration of FIG. 2 the plane of the fanshaped beam is perpendicular to the arrow "A" in the direction of arrow "B". However, the fan-shaped beam may be in a plane that is in other orientations relative to the direction of movement of the article being inspected. Examples of a dual energy x-ray inspection systems are described in U.S. Pat. Nos. 5,319,547 and 5,490,218 both of which are incorporated herein by reference.

Radiation attenuated by the articles being inspected impinges the radiation detector 20 that may include a single detector or an array of detectors, which are preferably crystal photo detector units. The output signals (scan data) from the radiation detector 20 may be analog signals that are subsequently digitized or they may be output by the radiation detector as digitized signals.

Figure 8:
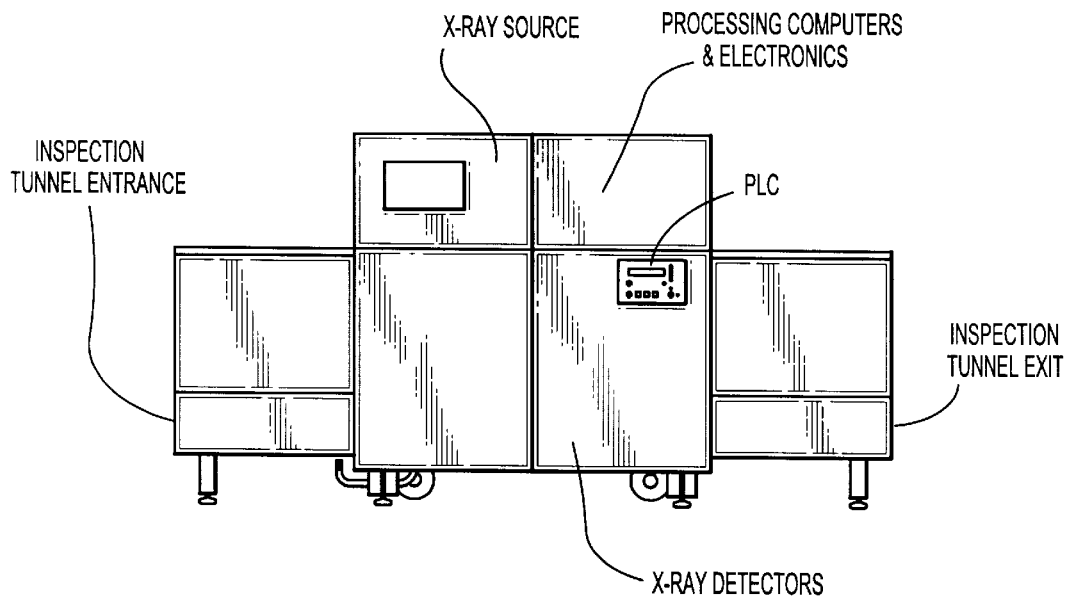
FIGS. 8 and 9 illustrate another exemplary embodiment of an article inspection system.
Figure 9:
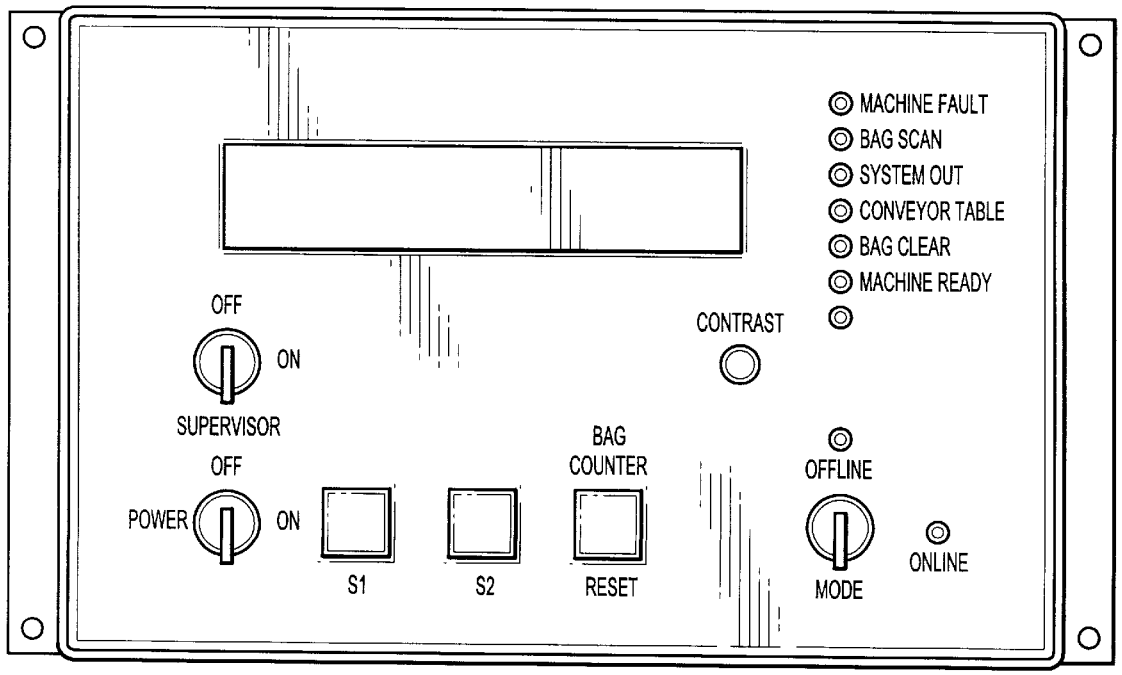

Another example of an article inspection system is shown in FIGS. 8 and 9. In this example, the article inspection system includes an x-ray source, x-ray detectors, a processor that controls the operation of the x-ray source and processes image data from the detectors, and a programmable logic control (PLC). Articles enter through an inspection tunnel entrance and are moved along a conveyor past the x-ray source and detectors and exit through an inspection tunnel exit. A more detailed description of the components of this article inspection system is provided in the Inspection System Functional Description provided in appendix A.

More detailed descriptions of article inspection systems and x-ray imaging techniques are provided in U.S. Pat. Nos. 5,182,764; 4,021,726; 5,126,674; 5,227,724; 5,227,725; 5,233,300; 5,319,547; 5,490,218; 5,600,700; 5,642,393; and 5,699,400 all of which are incorporated herein by reference. For example U.S. Pat. No. 5,642,393 discloses in step 200 of FIG. 6 the acquisition of a projection x-ray image of an article, where pixels in the projection image reflect combined influences of attenuation coefficients of voxels in the article but do not identify the coefficients if individual voxels along a raypath from the x-ray source to a pixel position.

Assigning Article Identification Numbers

To facilitate matching of the image and/or other data of a suspect article with the article, the article inspection system assigns an article identification number (AIN) to each suspect article and incorporates the assigned AIN into, for example, a header portion of the image data for each suspect article prior to transferring the image data to a workstation and/or a central server.

Article Tagging

To match the image data of a suspect article with the article, an article tagging portion generates tags which include information about a suspect article. The information may be in a coded or uncoded form and includes the article identification number. The information may also include a listing of suspected objects contained in a suspect article and a description of the article. Each tag can be applied either manually or automatically to any suspect baggage, and is preferably a sticker type, radio frequency (RF) tag or a magnetic tag. An RF tag includes a transmitter that emits an activation signal which activates an alarm, and a magnetic tag activates an alarm by changing magnetic fields. Each tag may also include information or other indicia (e.g. color coding) that notifies the person reclaiming the article to report to an appropriate inspection area without informing the person reclaiming that the article may contain suspected objects.

An example for identification of suspect articles when RF tags are used involves applying tags to every article inspected (suspect bags have active tags and non-suspect bags have inactive or dummy tags). Each person reclaiming an article then passes through a portal or walks through a detection system located in, for example, an inspection area. As a person with a suspect article passes through the portal, the activation signal emitted by the tag transmitter is received by a receiver in the portal so that an alarm is activated. The alarm may be an audible or visible alarm. A suitable RF tag is the "Sticker-tag" manufactured by ID Systems, Toronto, Ontario, Canada and a suitable portal is the BX system manufactured by ID Systems.

An example for identification of suspect articles when magnetic tags are used involves applying tags to every article inspected (suspect bags have active tags and non-suspect bags have dummy or inactive tags). Each person reclaiming an article then passes through a portal or walks through a detection system located in, for example, an inspection area. As a person with a suspect article passes through the portal, the magnetic field in the portal is changed by the magnetic tag so that an alarm is activated. The alarm may be an audible or visible alarm. A suitable magnetic tag is the TIRIS Passive RF ID tag manufactured by PEP Inc., Laguna Hills, Calif. and a suitable portal is the PEP Easy Reader manufactured by PEP Inc.

Image and Other Data Storage and Transfer

As noted, the article inspection system takes one or more image and/or other data of the contents of each article and the data is compared to data of known target materials to determine if an article contains contraband. Each article inspection system is electronically connected to a central server and/or one or more workstations so that when an article is determined to have least one target material therein, the data is formatted for transfer to the central server and saved for later retrieval. Alternatively, the data may be transferred to one of the workstations and displayed.

Prior to transfer the data may be compressed using known data compression standards.

Final Inspection

Figure 10:
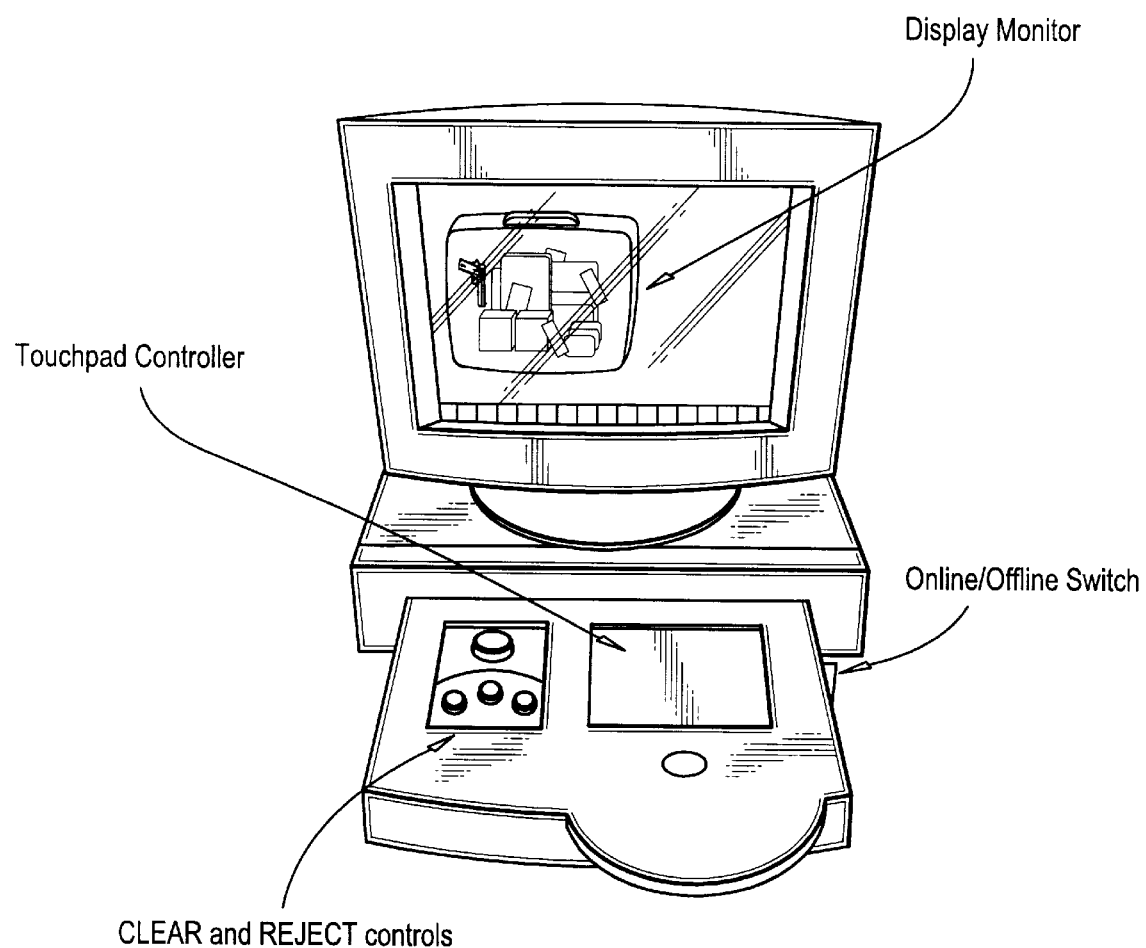
FIG. 10 illustrates an exemplary embodiment of an inspector workstation.

In instances where the tag is a sticker type, when a suspect article is brought to an inspection area, an inspector enters the article identification number at the inspector workstation using for example, a key pad or a bar code reader. Alternatively, the article identification number can be automatically entered using, for example, an automated bar code reader or RF tag reader. The workstation then retrieves from either local memory or the central server the suspect article's image and/or other data and displays the data on the workstation displays (seen in FIG. 10). If the image data is in a compressed format, the data is decompressed using known data decompression techniques prior to display. The workstation may be configured to display an image with suspected objects highlighted for easy identification by the inspector.

In instances where RF tags are used, the person reclaiming a suspect article passes through a portal located, for example in the inspection area. The portal includes a transmitter that sends a signal to a receiver on the RF tag that causes the tag to transmit the article information (including the AIN) to receivers in the portal. The portal may be connected to the central server or to one or more workstations so that once the suspect article information is received from an RF tag, the article information is transferred to the server and the server retrieves the image data and transfers the image data to the appropriate workstation. A suitable RF tag is the "Sticker-tag" manufactured by ID Systems, and a suitable portal is the BX System manufactured by ID Systems.

What is claimed:

1. A contraband detection and article reclaim system comprising:

at least one article inspection system configured to derive inspection data from at least one projection x-ray image of an article, where the projection image is two-dimensional and pixels therein reflect only combined influences of attenuation coefficients of voxels in the article, and compare the inspection data to target object data to detect contraband, and to assign matching information to each article in which contraband was detected that matches the article to its inspection data;

a server to which said at least one article inspection system is connected and to which said inspection data and said matching information are transferred;

an article tagging system configured to generate a tag for each article in which contraband was detected, said tag comprising information regarding the article derived from said at least one projection x-ray image and said matching information about the article; and at least one workstation coupled to said server and configured to permit entry of said matching information so that said inspection data of an article in which contraband was detected can be transferred to said workstation and to display said inspection data.

2. A system as in claim 1 in which the server is coupled with the inspection system to receive therefrom data representing the projection images of articles tagged by the tagging system, and including at least one inspector workstation coupled with the server to receive therefrom and display selected projection images.

3. A system as in claim 1 in which said tags are attached to the tagged articles, and including a tag detection system activated when an article with a tag moves therethrough.

4. A system as in claim 1 in which the tags include information identifying respective transmission images, and including a tag reading system activated by said tags to call corresponding transmission images for display.

* * * * *